United States Patent
Tuttle et al.

(10) Patent No.: US 6,177,859 B1
(45) Date of Patent: *Jan. 23, 2001

(54) RADIO FREQUENCY COMMUNICATION APPARATUS AND METHODS OF FORMING A RADIO FREQUENCY COMMUNICATION APPARATUS

(75) Inventors: John R. Tuttle; Mark E. Tuttle, both of Boise; Rickie C. Lake, Eagle, all of ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/955,200

(22) Filed: Oct. 21, 1997

(51) Int. Cl.⁷ ................................................. H04Q 5/22
(52) U.S. Cl. ............... 340/10.1; 340/572.1; 340/825.54; 340/825.3; 340/825.31; 340/825.34; 340/572.5; 342/22; 342/44; 342/50; 342/51; 455/38.2; 235/492; 174/52.9
(58) Field of Search ........................... 340/572.1, 825.54, 340/825.3, 825.31, 825.34, 10.1, 572.5; 342/22, 44, 50, 51; 455/38.2; 235/492; 174/52.4

(56) References Cited

U.S. PATENT DOCUMENTS

| | | | |
|---|---|---|---|
| 4,038,488 | * 7/1977 | Lin | 174/52.4 |
| 4,075,632 | 2/1978 | Baldwin et al. | 343/6.8 |
| 4,274,083 | * 6/1981 | Tomoeda | 340/825.54 |
| 4,625,102 | * 11/1986 | Rebjock et al. | 235/492 |
| 4,926,182 | 5/1990 | Ohta et al. | 342/44 |
| 5,153,583 | * 10/1992 | Murdoch | 340/825.54 |
| 5,528,222 | 6/1996 | Moskowitz et al. | 340/572 |
| 5,621,412 | 4/1997 | Sharpe et al. | 342/51 |
| 5,649,296 | 7/1997 | MacLellan et al. | 455/38.2 |
| 5,786,626 | * 7/1998 | Brady et al. | 343/873 |

FOREIGN PATENT DOCUMENTS 196 01 358 A1  7/1996 (DE).

OTHER PUBLICATIONS

Brown, A.R. et al., "Logic Gates Made from Polymer Transistors and Their Use in Ring Oscillators", Science vol. 270, Nov. 10, 1995, pp. 972–974.

* cited by examiner

*Primary Examiner*—Michael Tohar
*Assistant Examiner*—Jean B. Jeanglaude
(74) *Attorney, Agent, or Firm*—Wells, St. John, Roberts, Gregory & Matkin, P.S.

(57) ABSTRACT

A method of forming a radio frequency communication apparatus includes providing a substrate provided with an outermost surface. An RFID is adhered at least partially within the substrate, and the RFID includes an antenna and an integrated circuit. The RFID and substrate together form a radio frequency communication apparatus. A method of forming a radio frequency communication apparatus includes providing a substrate with a frontside surface. An opening is formed through the frontside surface and into the substrate. An RFID is inserted within the opening and adhered to the substrate within the opening. The RFID includes an antenna and an integrated circuit to form a radio frequency communication apparatus.

37 Claims, 3 Drawing Sheets

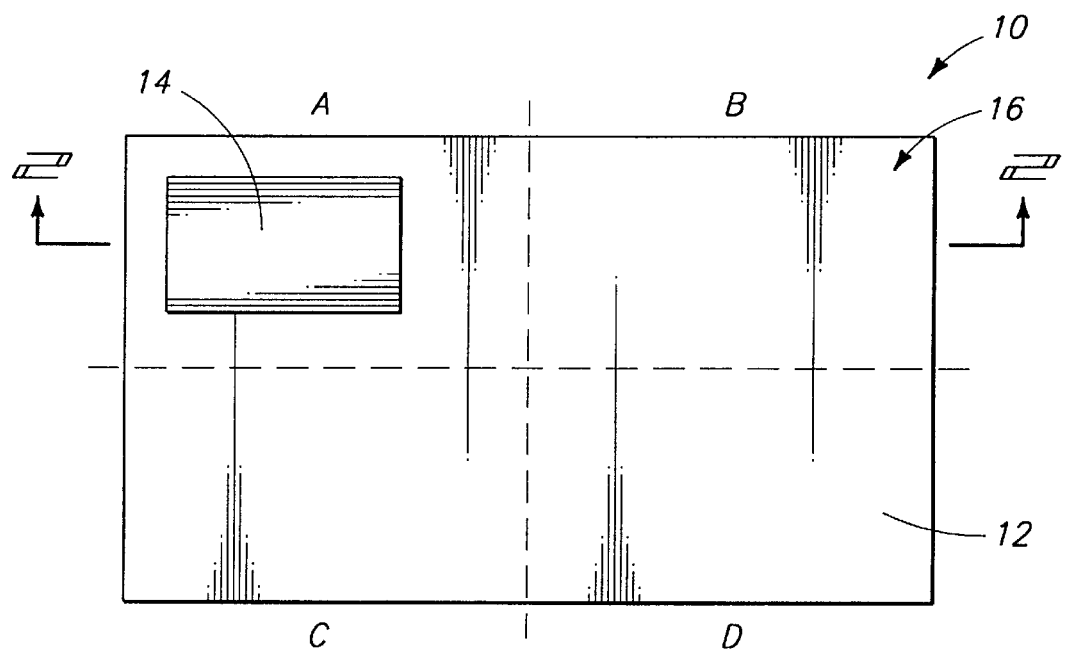
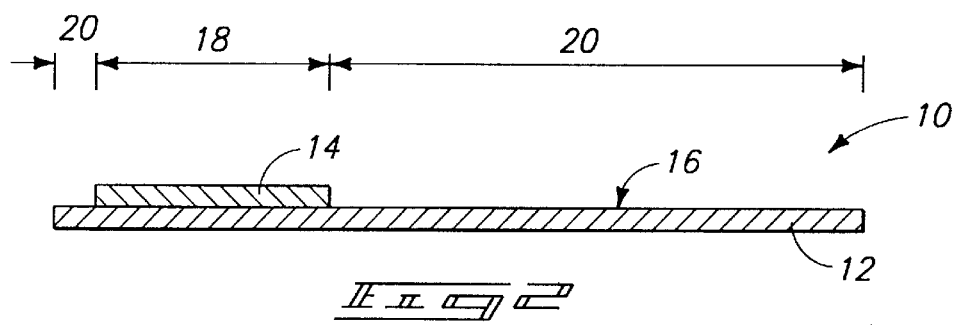
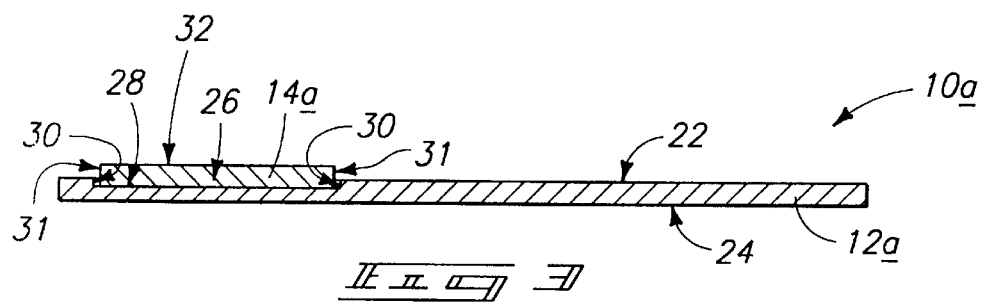

RADIO FREQUENCY COMMUNICATION APPARATUS AND METHODS OF FORMING A RADIO FREQUENCY COMMUNICATION APPARATUS

TECHNICAL FIELD

The invention pertains to radio frequency communication apparatuses and to methods of forming radio frequency communication apparatuses.

BACKGROUND OF THE INVENTION

Radio frequency communication apparatuses are devices configured for communicating with other devices through radio frequencies. Radio frequency communication apparatuses can comprise radio frequency identification devices (RFIDS). RFIDs are described in detail in U.S. patent application Ser. No. 08/705,043, filed Aug. 29, 1996, and incorporated herein by reference. RFIDs can comprise wireless communication circuitry or transponder circuitry for providing wireless communications with an interrogator unit. RFIDs can comprise integrated circuit chips. Such chips can contain, for example, a processor and memory. RFIDs comprising integrated circuitry may be referred to as intelligent RFIDs or as remote intelligent communication (RIC) devices. Radio frequency communication apparatuses can further comprise transmit and receive antennas electrically connected with an RFID. The antennas can be suitable for respectively transmitting and receiving wireless signals or RF energy.

Incorporating RFIDs into radio frequency communication apparatuses can be laborious and expensive. Accordingly, it is desirable to develop alternative methods for incorporating RFIDs into radio frequency communication apparatuses.

SUMMARY OF THE INVENTION

In one aspect, the invention encompasses a method of forming a radio frequency communication apparatus. A substrate is provided. The substrate has an outermost surface. An RFID is adhered to the substrate outermost surface. The RFID comprises an antenna and an integrated circuit. An entirety of the RFID is received outwardly of the substrate outermost surface.

In another aspect, the invention encompasses a method of forming a radio frequency communication apparatus. A substrate is provided. The substrate has a frontside surface. An opening is formed through the frontside surface and into the substrate. An RFID is inserted within the opening. The RFID is adhered to the substrate within the opening. The RFID comprises an antenna and an integrated circuit.

In another aspect, the invention encompasses a radio frequency communication apparatus. The apparatus comprises a substrate having an outermost surface. The apparatus further comprises an RFID adhered to the substrate outermost surface. The RFID comprises an antenna and an integrated circuit. An entirety of the RFID is received outwardly of the substrate outermost surface.

BRIEF DESCRIPTION OF THE DRAWINGS

Preferred embodiments of the invention are described below with reference to the following accompanying drawings.

FIG. 1 is a diagrammatic top view of a radio frequency communication apparatus produced according to a method of the present invention.

FIG. 2 is a diagrammatic cross-sectional side view of the FIG. 1 radio frequency communication apparatus taken along the line 2—2, showing a radio frequency communication apparatus produced according to a first embodiment method of the present invention.

FIG. 3 is a diagrammatic cross-sectional side view of the radio frequency communication apparatus of FIG. 1 taken along the line 2—2, and showing a radio frequency communication apparatus produced according to a second embodiment method of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

FIG. 1 illustrates a radio frequency communication apparatus 10 of the present invention. Device 10 comprises a substrate 12 and an RFID 14 proximate substrate 12. Substrate 12 can comprise a card having length and width dimensions corresponding to those of a credit card, and can comply with ISO 7816. For example, substrate 12 can have a length of from about 0.8 inch to about 6.75 inches, a width of from about 0.5 inch to about 4.25 inches, and a thickness of from about 0.010 inch to about 0.20 inch. Further, substrate 12 can comprise polyester, PVC and/or ABS, and can be substantially homogenous throughout an entirety of its construction. Substrate 12 consists of four peripheral quadrants, "A", "B", "C", and "D". Such four quadrants have substantially equal areas relative to one another. In the shown embodiment, RFID 14 is entirely contained within the quadrant "A".

Figure 7:
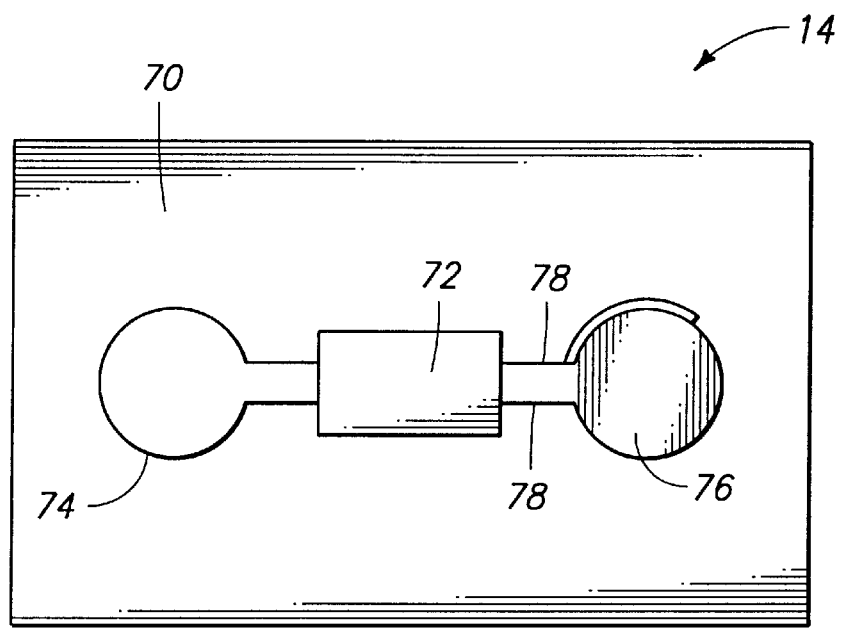
FIG. 7 is a diagrammatic top view of an RFID of the present invention.

RFID 14 can be a chip comprising an integrated circuit and an antenna, and configured for communicating with an interrogator. RFID 14 will preferably also comprise a battery in electrical communication with the integrated circuit. Alternatively, as shown in FIG. 7, RFID 14 can comprise a substrate 70 upon which is adhered an integrated circuit chip 72, an antenna 74, and a battery 76. Chip 72 and battery 76 are electrically interconnected to one another through conductive interconnects 78. Chip 72, battery 76 and antenna 74 can be covered with a protective surface, such as, for example, an encapsulant. Such protective surface can be provided prior to adhering RFID 14 to substrate 12, or after adhering RFID 14 to substrate 12.

In accordance with the present invention, RFID 14 can be mounted to substrate 12 in a variety of configurations. A first of the configurations is illustrated in FIG. 2. Substrate 12 comprises a substantially planar outer surface 16 upon which is adhered RFID 14. An entirety of RFID 14 is thus received outwardly of substrate outermost surface 16. In the shown embodiment, RFID 14 covers a portion 18 of outer surface 16 and leaves another portion 20 uncovered, or exposed. In alternative embodiments which are not shown, RFID 14 can cover an entirety of outer surface 16. RFID 14 can be adhered with, for example, an epoxy adhesive.

A second embodiment configuration of a radio frequency communication apparatus of the present invention is illustrated in FIG. 3. In referring to FIG. 3, similar numbering to that used above in describing FIGS. 1 and 2 is utilized, with differences indicated by the suffix "a" or by different numerals. Radio frequency communication apparatus 10a comprises a substrate 12a having a frontside surface 22 and a backside surface 24. An opening 26 is formed through frontside surface 22 and into substrate 12a. Opening 26 can be formed, for example, by molding the opening within substrate 12a as substrate 12a is formed. As another example, opening 26 can be formed by cutting the opening into substrate 12a after substrate 12a is formed. Opening 26 extends only partially into substrate 12a and comprises a periphery defined by an interior bottom surface 28 and by interior side surfaces 30.

An RFID 14a is inserted within opening 26 and adhered to substrate 12a. RFID 14 has laterally outwardmost surfaces 31 laterally inward of interior side surfaces 30. RFID surfaces 31 can be abutted against interior side surfaces 30, but are more preferably displaced from the side surfaces 30 as shown. RFID surfaces 31 are preferably displaced from side surfaces 30 by a distance of less than or equal to about 3 mils when RFID 14 is approximately centered within opening 26, and more preferably displaced by a distance of less than or equal to about 2 mils. Thus, if RFID 14 is abutted against a side surface 30, rather than being approximately centered within opening 26, the largest gap between a surface 31 and a side surface 30 will preferably be less than or equal to about 6 mils, and more preferably less than or equal to about 4 mils. The gaps between RFID surfaces 31 and side surfaces 30 can receive a bonding adhesive to adhere RFID 14 to substrate 12a. RFID 14a can be adhered to substrate 12a by adhesive applied to bottom surface 28 and/or to side surfaces 30.

RFID 14a comprises a top surface 32. In the shown embodiment, top surface 32 is above frontside surface 22 of substrate 12a. In alternate embodiments, top surface 32 of RFID 14a can be below frontside surface 22, or substantially flush with frontside surface 22. Such alternative embodiments can be formed by extending opening 26 further into substrate 12a than shown, or by utilizing a substrate 12a which is thicker relative to RFID 14a than the shown configuration.

Figure 4:
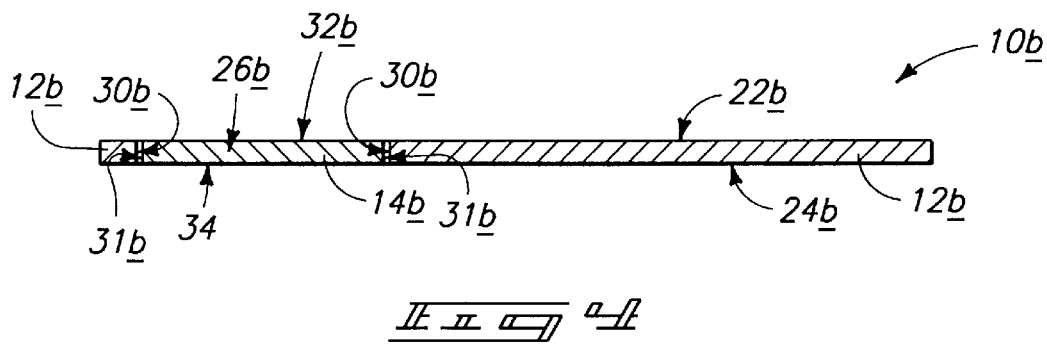
FIG. 4 is a diagrammatic cross-sectional side view of the radio frequency communication apparatus of FIG. 1 taken along the line 2—2, and showing a radio frequency communication apparatus produced according to a third embodiment method of the present invention.

A third embodiment configuration of a radio frequency communication apparatus of the present invention is described with reference to FIG. 4. In referring to FIG. 4, similar numbering to that used in describing FIGS. 1–3 is utilized, with differences indicated by the suffix "b" or by different numerals. FIG. 4 is a cross-sectional view along the same line as that of FIG. 2. FIG. 4 illustrates a radio frequency communication apparatus 10b comprising a substrate 12b and an opening 26b extending entirely through substrate 12b. RFID 14b comprises a top surface 32b and a bottom surface 34. Top surface 32b is substantially flush with frontside surface 22b of substrate 12b, and bottom surface 34 is substantially flush with backside surface 24b of substrate 12b. In alternative embodiments, top surface 32b can extend above or below frontside surface 22b, and bottom surface 34 can extend above or below backside surface 24b.

Figure 8:
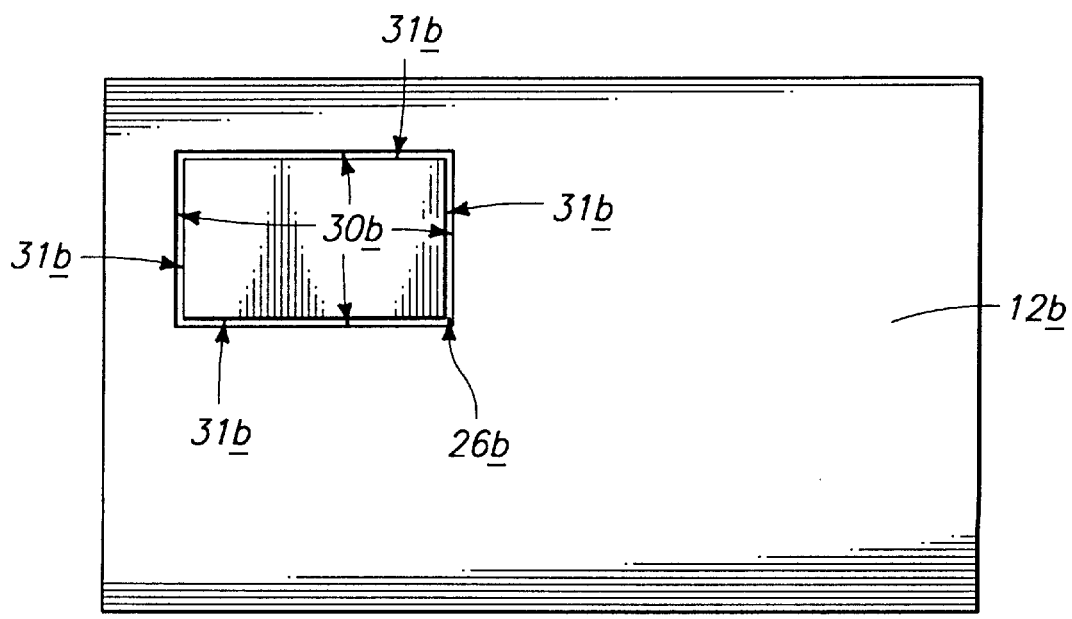
FIG. 8 is a diagrammatic top view of the radio frequency communication apparatus of FIG. 4.

As shown in FIG. 8, opening 26b comprises a rectangular shaped internal periphery defined by sides 30b. RFID 14b comprises an external periphery having a rectangular shape complementary to the internal periphery shape of opening 26b. The external periphery of RFID 14b is defined by sides 31b. Each of sides 31b is proximate a side 30b. RFID 14b is preferably sized relative to opening 26b such that each of sides 31b is within about 3 mils of a proximate side 30b when RFID 14b is approximately centered within opening 26b. More preferably, RFID 14b is sized relative to opening 26b such that each of sides 31b is within about 2 mils of a proximate side 30b when RFID 14b is approximately centered within opening 26b. In practice, RFID 14b is placed within opening 26b with a mechanized system and adhered to substrate 12b, with, for example, epoxy. The slight displacement of sides 31b from sides 30b enables the epoxy to squeeze into gaps between sides 31b and 30b and adhere sides 31b and 30b to one another.

Figure 5:
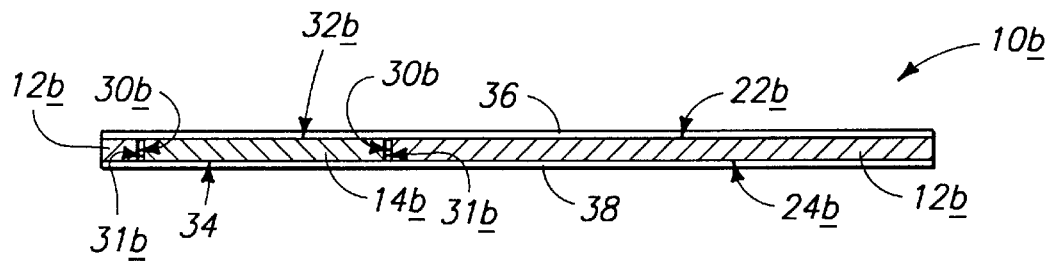
FIG. 5 shows the radio frequency communication apparatus of FIG. 4, further processed according to a fourth embodiment of the present invention.

Radio frequency communication apparatus 12b can be further processed as shown in FIG. 5. Laminating films 36 and 38 are provided over frontside surface 22b and backside surface 24b, respectively, of substrate 12b. Laminating films 36 and 38 extend over top surface 32b and bottom surface 34, respectively, of RFID 14b. Laminating films 36 and 38 can comprise, for example, thin plastic sheets adhesively, or thermally, adhered to substrate 12b and RFID 14b.

Laminating films 36 and 38 protect RFID 14b and substrate 12b. Also, laminating films 36 and 38 can aid in retaining RFID 14b within substrate 12b. Further, laminating films 36 and 38 can be printed with a message which is to be displayed on radio frequency communication apparatus 10b. Such message can be, for example, a set of instructions for use of radio frequency device 10b, or advertising. Laminating films 36 and 38 can both be formed after insertion of RFID 14b within substrate 12b. Alternatively, one of laminating films 36 or 38 can be formed before insertion of RFID 14b within substrate 12b and the other of laminating films 36 and 38 can be formed after such insertion.

Although laminating films are shown formed over both frontside surface 22b and backside surface 24b, in alternative embodiments a laminating film can be formed over only one of surfaces 22b and 24b. Also, although laminating films 36 and 38 are shown extending entirely over surfaces 32b, 22b, 24b and 34, in alternative embodiments the laminating films may be formed to extend only partially over one or more of surfaces 32b, 22b, 34 and 24b. Laminating films 36 and 38 preferably extend entirely over surfaces 32b and 34 and at least over portions of surfaces 22b and 24b which are proximate to surfaces 32b and 34.

Figure 6:
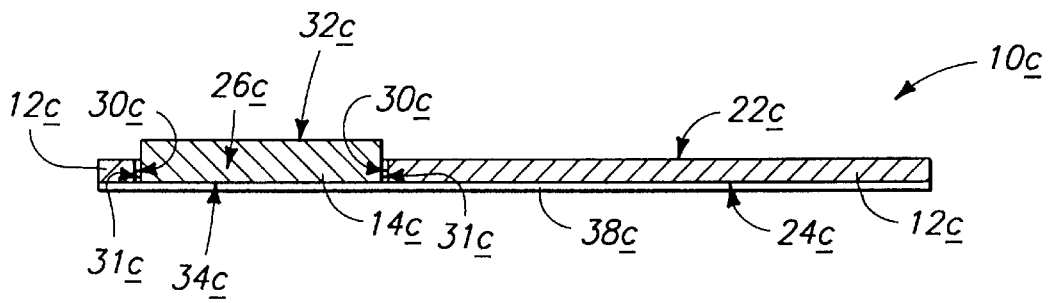
FIG. 6 is a diagrammatic cross-sectional side view of the FIG. 1 radio frequency communication apparatus taken along the line 2—2 and showing a fifth embodiment method of the present invention.

An alternative construction of a radio frequency communication apparatus of the present invention is described with reference to FIG. 6. In referring to FIG. 6, similar numbering to that used above in describing FIGS. 1–5 is utilized, with differences indicated by the suffix "c" or by different numerals. Radio frequency communication apparatus 10c comprises a substrate 12c having an opening 26c formed therethrough. Within opening 26c is an RFID 14c. RFID 14c has a top surface 32c which is above frontside surface 22c of substrate 12c. Radio frequency communication apparatus 10c further comprises a laminating film 38c formed over a backside surface 24c of substrate 12c and over a bottom surface 34c of RFID 14c. Laminating film 38c may be formed before or after insertion of RFID 14c within opening 26c. In alternative embodiments of the invention, a second laminating film could be formed over top surface 32c of RFID 14c and over frontside surface 22c of substrate 12c.

The invention arose out of needs specifically associated with RFIDs. However, the artisan will appreciate that the invention can have application to smart cards.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a radio frequency communication apparatus comprising:

provding a substrate having a frontside surface;

forming an opening through the frontside surface and into the substrate, the opening having a periphery defined by substrate interior side surfaces;

inserting an RFID within the opening, the RFID having laterally outwardmost surfaces, the RFID laterally outwardmost surfaces being laterally inward of the interior side surfaces; and adhering the RFID to the substrate within the opening, the RFID comprising an antenna and an integrated circuit, the RFID and substrate together comprising a radio frequency communication apparatus.

2. The method of claim 1 wherein the forming the opening comprises molding the substrate with the opening therein during formation of the substrate.

3. The method of claim 1 wherein the forming the opening comprises cutting the substrate.

4. The method of claim 1 wherein the forming the opening comprises forming the opening to extend entirely through the substrate.

5. The method of claim 1 wherein the forming the opening comprises forming the opening to extend only partially into the substrate.

6. The method of claim 1 wherein the substrate comprises a portion of the frontside surface proximate the opening, the method further comprising:

forming a laminating film over the RFID and over the portion of the frontside surface.

7. The method of claim 1 wherein the substrate comprises a backside surface, wherein the forming the opening comprises forming the opening to extend entirely through the substrate and through the backside surface, and wherein the substrate comprises a portion of frontside surface proximate the opening, the method further comprising:

forming a first laminating film over the backside surface to cover the opening in the backside surface; and forming a second laminating film over the RFID and over the portion of the frontside surface.

8. The method of claim 1 wherein the forming the opening comprises forming the opening to extend only partially into the substrate, wherein the RFID has a top surface, wherein a portion of the frontside surface is proximate the RFID top surface after inserting the RFID within the opening, and wherein the RFID top surface is substantially flush with said portion of the frontside surface after inserting the RFID within the opening.

9. The method of claim 1 wherein the forming the opening comprises forming the opening to extend only partially into the substrate, wherein the RFID has a top surface, wherein a portion of the frontside surface is proximate the RFID top surface after inserting the RFID within the opening, and wherein the RFID top surface is above said portion of the frontside surface after inserting the RFID within the opening and adhering the RFID to the substrate.

10. The method of claim 1 wherein the forming the opening comprises forming the opening to extend entirely through the substrate, wherein the RFID has a top surface, wherein a portion of the frontside surface is proximate the RFID top surface after inserting the RFID within the opening, and wherein the RFID top surface is substantially flush with said portion of the frontside surface after inserting the RFID within the opening.

11. The method of claim 1 wherein the forming the opening comprises forming the opening to extend entirely through the substrate, wherein the RFID has a top surface, wherein a portion of the frontside surface is proximate the RFID top surface after inserting the RFID within the opening, and wherein the RFID top surface is above said portion of the frontside surface after inserting the RFID within the opening and adhering the RFID to the substrate.

12. The method of claim 1 wherein the substrate comprises a backside surface, wherein the forming the opening comprises forming the opening to extend entirely through the substrate and through the backside surface, wherein the RFID has a top surface, wherein a portion of the frontside surface is proximate the RFID top surface after inserting the RFID within the opening, and wherein the RFID top surface is substantially flush with said portion of the frontside surface after inserting the RFID within the opening, the method further comprising:

forming a first laminating film over the backside surface to cover the opening in the backside surface; and forming a second laminating film over the RFID and over the portion of the frontside surface.

13. The method of claim 1 wherein the substrate comprises a backside surface, wherein the forming the opening comprises forming the opening to extend entirely through the substrate and through the backside surface, wherein the RFID has a top surface, wherein a portion of the frontside surface is proximate the RFID top surface after inserting the RFID within the opening, and wherein the RFID top surface is above said portion of the frontside surface after inserting the RFID within the opening and adhering the RFID to the substrate, the method further comprising:

forming a first laminating film over the backside surface to cover the opening in the backside surface; and forming a second laminating film over the RFID and over the portion of the frontside surface.

14. The method of claim 1 wherein the substrate has a thickness of from about 0.010 inch to about 0.200 inch.

15. The method of claim 1 wherein the substrate has length and width dimensions of a credit card and conforms to ISO 7816.

16. The method of claim 1 wherein the RFID further comprises a battery.

17. The method of claim 1 wherein the RFID extends through only a portion of the substrate outermost surface.

18. The method of claim 1 wherein the substrate consists of four peripheral quadrants having substantially equal areas, and wherein the RFID is entirely contained within one of the four quadrants.

19. The method of claim 1 wherein the RFID extends through a portion of the substrate outermost surface and leaves an uncovered portion of the substrate outermost surface, the radio frequency communication apparatus further comprising:

a laminating film extending over the RFID and over the uncovered portion of the substrate outermost surface.

20. The method of claim 1 herein the substrate outermost surface is substantially planar.

21. The method of claim 1 wherein the periphery of the opening comprises an internal periphery having a shape, and wherein the laterally outwardmost surfaces of the RFID comprises an external periphery having a shape complementary to the internal periphery shape of the opening.

22. The method of claim 21 wherein the internal periphery shape of the opening is rectangular and the external periphery shape of the RFID is rectangular.

23. The method of claim 21 wherein the internal periphery shape of the opening is rectangular and the external periphery shape of the RFID is rectangular and sized to fit in the opening with less than or equal to a 6 mil clearance between any side of the rectangular external periphery of the RFID shape and any side of the rectangular internal periphery of the opening shape.

24. A radio frequency communication apparatus comprising:

a substrate having a frontside surface;

an opening extending through the frontside surface and into the substrate, the opening having a periphery defined by substrate interior side surfaces, a portion of the frontside surface being proximate the opening;

an RFID within the opening, the RFID comprising an antenna and an integrated circuit, the RFID having laterally outwardmost surfaces, the RFID laterally outwardmost surfaces being laterally inward of the interior side surfaces, the RFID having a top surface which is at least as high as the portion of the frontside surface proximate the opening.

25. The radio frequency communication apparatus of claim 24 wherein the substrate has a thickness of from about 0.010 inch to about 0.200 inch.

26. The radio frequency communication apparatus of claim 24 wherein the RFID is adhered to the substrate.

27. The radio frequency communication apparatus of claim 24 wherein the substrate consists of four peripheral quadrants having substantially equal areas, and wherein the opening and RFID are entirely contained within one of the four quadrants.

28. The radio frequency communication apparatus of claim 24 wherein the opening extends entirely through the substrate.

29. The radio frequency communication apparatus of claim 24 wherein the opening extends only partially into the substrate.

30. The radio frequency communication apparatus of claim 24 further comprising:

a laminating film extending over the RFID and over the portion of the frontside surface proximate the opening.

31. The radio frequency communication apparatus of claim 24 wherein the substrate comprises a backside surface, and wherein the opening extends entirely through the substrate and through the backside surface, the radio frequency communication apparatus further comprising:

a first laminating film extending over the backside surface and covering the opening in the backside surface; and a second laminating film extending over the RFID and over the portion of the frontside surface proximate the opening.

32. The radio frequency communication apparatus of claim 24 wherein the opening extends only partially into the substrate, and wherein the RFID top surface is substantially flush with said portion of the frontside surface proximate the opening.

33. The radio frequency communication apparatus of claim 24 wherein the opening extends only partially into the substrate, and wherein the RFID top surface is above said portion of the frontside surface proximate the opening.

34. The radio frequency communication apparatus of claim 24 wherein the opening extends entirely through the substrate, and wherein the RFID top surface is substantially flush with the portion of the frontside surface proximate the opening.

35. The radio frequency communication apparatus of claim 24 wherein the opening extends entirely through the substrate, and wherein the RFID top surface is above the portion of the frontside surface proximate the opening.

36. The radio frequency communication apparatus of claim 24 wherein the substrate comprises a backside surface, wherein the opening extends entirely through the substrate and through the backside surface, and wherein the RFID top surface is substantially flush the said portion of the frontside surface proximate the opening, the radio frequency communication apparatus further comprising:

a first laminating film extending over the backside surface and covering the opening in the backside surface; and a second laminating film extending over the RFID and over the portion of the frontside surface proximate the opening.

37. The radio frequency communication apparatus of claim 24 wherein the substrate comprises a backside surface, wherein the opening extends entirely through the substrate and through the backside surface, and wherein the RFID top surface is above the portion of the frontside surface proximate the opening, the radio frequency communication apparatus further comprising:

a first laminating film extending over the backside surface and covering the opening in the backside surface; and a second laminating film extending over the RFID and over the portion of the frontside surface proximate the opening.

* * * * *

UNITED STATES PATENT AND TRADEMARK OFFICE
CERTIFICATE OF CORRECTION

PATENT NO : 6,177,859
DATED : January 23, 2001
INVENTOR(S) : John R. Tuttle et al.

It is certified that error appears in the above-identified patent and that said Letters Patent are hereby corrected as shown below:

Col. 6, line 66
  replace "herein"
  with --wherein--.

Signed and Sealed this

Twenty-ninth Day of May, 2001

NICHOLAS P. GODICI

Attest:

Attesting Officer

Acting Director of the United States Patent and Trademark Office

UNITED STATES PATENT AND TRADEMARK OFFICE
CERTIFICATE OF CORRECTION

PATENT NO. : 6,177,859 B1
DATED : January 23, 2001
INVENTOR(S) : John R. Tuttle et al.

It is certified that error appears in the above-identified patent and that said Letters Patent is hereby corrected as shown below:

Column 6,
Line 66, replace "herein" with -- wherein --.

Signed and Sealed this

Twelfth Day of October, 2004

JON W. DUDAS
*Director of the United States Patent and Trademark Office*